US012579068B2

(12) United States Patent
Bradshaw

(10) Patent No.: US 12,579,068 B2
(45) Date of Patent: Mar. 17, 2026

(54) SYSTEMS, METHODS, AND MEDIA FOR UNORDERED INPUT/OUTPUT DIRECT MEMORY ACCESS OPERATIONS

(71) Applicant: SK hynix NAND Product Solutions Corporation, Rancho Cordova, CA (US)

(72) Inventor: Samuel Bradshaw, Sacramento, CA (US)

(73) Assignee: SK hynix NAND Product Solutions Corporation, Rancho Cordova, CA (US)

( * ) Notice: Subject to any disclaimer, the term of this patent is extended or adjusted under 35 U.S.C. 154(b) by 68 days.

(21) Appl. No.: 18/536,878

(22) Filed: Dec. 12, 2023

(65) Prior Publication Data

US 2025/0190349 A1     Jun. 12, 2025

(51) Int. Cl.
| | |
|---|---|
| *G06F 12/08* | (2016.01) |
| *G06F 12/0831* | (2016.01) |
| *G06F 13/16* | (2006.01) |
| *G06F 13/42* | (2006.01) |

(52) U.S. Cl.
CPC ...... *G06F 12/0833* (2013.01); *G06F 13/1668* (2013.01); *G06F 13/4221* (2013.01)

(58) Field of Classification Search
CPC ............. G06F 13/1668; G06F 13/4221; G06F 12/0833
USPC ........................................................ 711/154
See application file for complete search history.

(56) References Cited

U.S. PATENT DOCUMENTS

| | | | |
|---|---|---|---|
| 7,124,231 | B1 | 10/2006 | Garner et al. |
| 2021/0073151 | A1 | 3/2021 | Sen et al. |
| 2022/0114099 | A1 | 4/2022 | Blankenship et al. |
| 2023/0027178 | A1 | 1/2023 | Shah et al. |
| 2023/0036751 | A1* | 2/2023 | Guim Bernat ...... G06F 12/0815 |
| 2023/0069152 | A1 | 3/2023 | Akkawi et al. |
| 2025/0190349 | A1* | 6/2025 | Bradshaw ............... G06F 13/28 |

OTHER PUBLICATIONS

International Search Report and Written Opinion dated Apr. 2, 2025 in International Patent Application No. PCT/US2024/58634, pp. 1-10.

* cited by examiner

*Primary Examiner* — Christopher B Shin
(74) *Attorney, Agent, or Firm* — Byrne Poh LLP

(57) ABSTRACT

Mechanisms for unordered input/output direct memory access operations are provided, including: issuing using a hardware processor a back invalidate snoop request to a cache coherency control unit of a host processor; and issuing an unordered input/output direct memory access operation request to a Compute Express Link memory device. In some of these mechanisms, the unordered input/output direct memory access operation request is for a read operation. In some of these mechanisms, the mechanisms further comprise receiving a response to the unordered input/output direct memory access operation request including data from the Compute Express Link memory device. In some of these mechanisms, the data was updated in response to the back invalidate snoop request. In some of these mechanisms, the unordered input/output direct memory access operation request is for a write operation.

21 Claims, 5 Drawing Sheets

SYSTEMS, METHODS, AND MEDIA FOR UNORDERED INPUT/OUTPUT DIRECT MEMORY ACCESS OPERATIONS

BACKGROUND

Unordered input/output (UIO) direct memory access (DMA) operations at Compute Express Link memory (CXL.mem) devices are frequently requested by peripheral component interconnect express (PCIe) devices. During these operations, a PCIe device may either read data from or write data to a CXL.mem device.

It is desirable to improve the performance of PCIe and CXL.mem devices involved in such operations.

Accordingly, new mechanisms (including systems, methods, and media) for unordered input/output direct memory access operations are desirable.

SUMMARY

In accordance with some embodiments, mechanisms (including systems, methods, and media) for unordered input/output direct memory access operations are provided.

In some embodiments, systems for unordered input/output direct memory access operations are provided, the systems comprising: a memory; and a hardware processor coupled to the memory and configure to a least: issue a back invalidate snoop request to a cache coherency control unit of a host processor; and issue an unordered input/output direct memory access operation request to a Compute Express Link memory device. In some of these embodiments, the unordered input/output direct memory access operation request is for a read operation. In some of these embodiments, the hardware processor is further configured to receive a response to the unordered input/output direct memory access operation request including data from the Compute Express Link memory device. In some of these embodiments, the data was updated in response to the back invalidate snoop request. In some of these embodiments, the unordered input/output direct memory access operation request is for a write operation. In some of these embodiments, the unordered input/output direct memory access operation request includes data to be written to the Compute Express Link memory device. In some of these embodiments, a cache line is invalidated in response to the back invalidate snoop request.

In some embodiments, methods for unordered input/output direct memory access operations are provided, the methods comprising: issuing using a hardware processor a back invalidate snoop request to a cache coherency control unit of a host processor; and issuing an unordered input/output direct memory access operation request to a Compute Express Link memory device. In some of these embodiments, the unordered input/output direct memory access operation request is for a read operation. In some of these embodiments, the method further comprises receiving a response to the unordered input/output direct memory access operation request including data from the Compute Express Link memory device. In some of these embodiments, the data was updated in response to the back invalidate snoop request. In some of these embodiments, the unordered input/output direct memory access operation request is for a write operation. In some of these embodiments, the unordered input/output direct memory access operation request includes data to be written to the Compute Express Link memory device. In some of these embodiments, a cache line is invalidated in response to the back invalidate snoop request.

In some embodiments, non-transitory computer-readable media containing computer executable instructions that, when executed by a processor, cause the processor to perform a method for unordered input/output direct memory access operation, the method comprising: issuing a back invalidate snoop request to a cache coherency control unit of a host processor; and issuing an unordered input/output direct memory access operation request to a Compute Express Link memory device. In some of these embodiments, the unordered input/output direct memory access operation request is for a read operation. In some of these embodiments, the method further comprises receiving a response to the unordered input/output direct memory access operation request including data from the Compute Express Link memory device. In some of these embodiments, the data was updated in response to the back invalidate snoop request. In some of these embodiments, the unordered input/output direct memory access operation request is for a write operation. In some of these embodiments, the unordered input/output direct memory access operation request includes data to be written to the Compute Express Link memory device. In some of these embodiments, a cache line is invalidated in response to the back invalidate snoop request.

DETAILED DESCRIPTION

In accordance with some embodiments, mechanisms (including systems, methods, and media) for unordered input/output direct memory access operations are provided.

Figure 1:
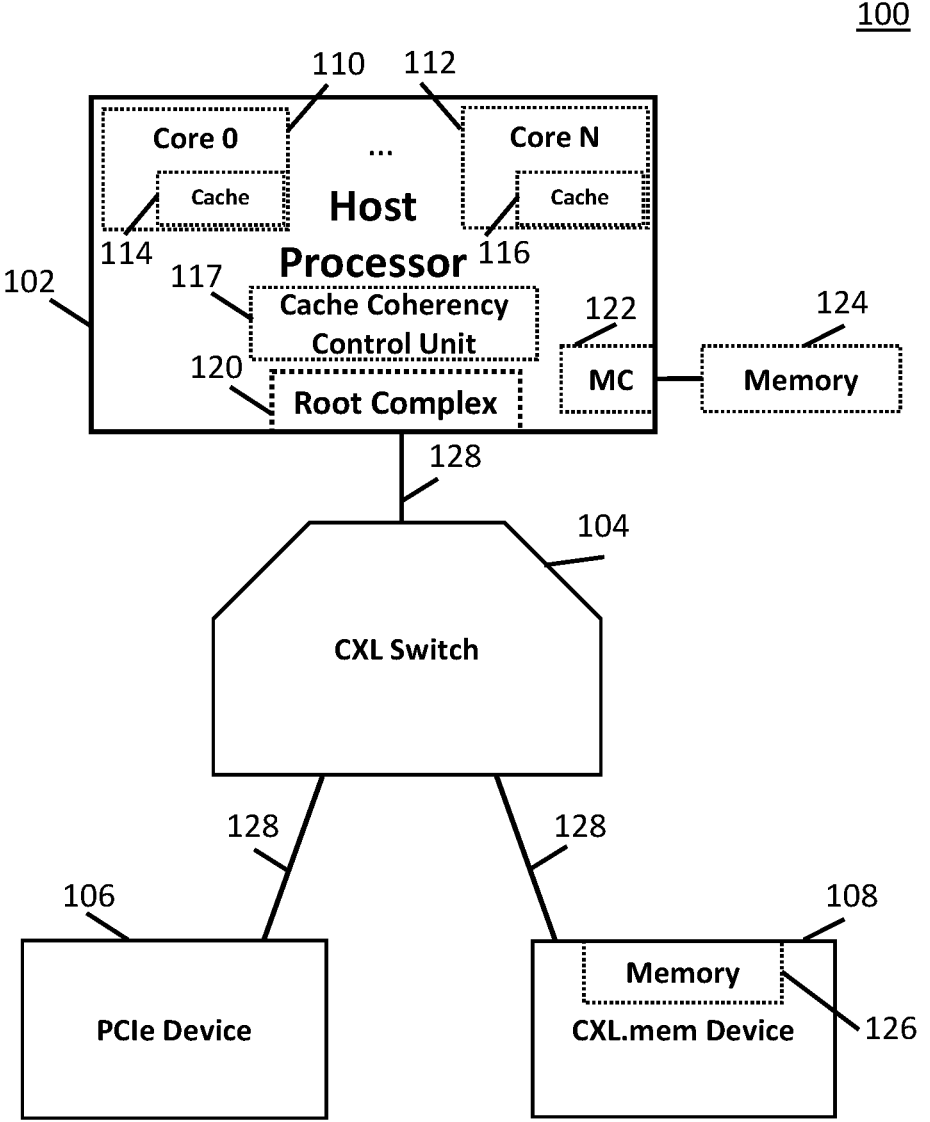
FIG. 1 is a block diagram of an example of hardware that can be used in accordance with some embodiments.

Turning to FIG. 1, an example 100 of hardware that can be used in accordance with some embodiments is shown. As illustrated, hardware 100 includes a host processor 102, a Compute Express Link (CXL) switch 104, a PCIe device 106, a CXL memory (CXL.mem) device 108, and memory 124. Any other suitable devices can also be included in hardware 100 in some embodiments. In some embodiments, hardware 100 can be included in, part of, and/or connected to any suitable general purpose or special purpose computing device such as a desktop computer, a laptop computer, a tablet computer, a server, an embedded device, a sensor, an Internet of Things device, and/or any other suitable device.

As shown in FIG. 1, host processor 102 can include any suitable number (including only one) of processor cores 110 and 112, and each processor core can include one or more caches (e.g., caches 114 and 116 for processor cores 110 and 112, respectively), in some embodiments. Host processor 102 can be implemented using a hardware processor, such as a microprocessor. The host processor can be configured (e.g., through executable code) to provide a cache coherency control unit 117 (which can be any suitable hardware and/or software for managing the cache coherency state of memory) and a root complex 120, in some embodiments. Host processor 102 can also be configured to provide a memory controller (e.g., implemented as hardware or a combination of hardware and microcode for implementing bus scheduling algorithms) that can be used to interface the host processor to memory 124 (which can be implemented using dynamic random access memory, static random access memory, and/or any suitable volatile and/or non-volatile byte addressable memory technologies), in some embodiments.

CXL switch can be any suitable switch compatible with the CXL standard and can be implemented using any suitable hardware, executable code, or a combination of the same, in some embodiments.

PCIe device 106 can be any suitable PCIe device, such as a solid-state drive (SSD) (which can be implemented using random access memory, read-only memory, flash memory, NAND memory (e.g., multi-plane NAND memory, 3D NAND, memory with any of the following memory densities: single-level cells (SLCs), multilevel cells (MLCs), triple-level cells (TLCs), quad-level cells (QLCs), penta-level cells (PLCs), and any suitable memory density that is greater than five bits per memory cell, and/or any other suitable memory), a hard disk drive, an optical media drive, a general or special purpose GPU, a compute or data movement accelerator, a network interface card, or a data processing unit, in some embodiments.

CXL.mem device 126 can be any suitable memory device compatible with the CXL standard in some embodiments. As shown, CXL.mem device 126 can include any suitable memory, such as random access memory, read-only memory, flash memory, NAND memory (e.g., multi-plane NAND memory, 3D NAND, memory with any of the following memory densities: single-level cells (SLCs), multilevel cells (MLCs), triple-level cells (TLCs), quad-level cells (QLCs), penta-level cells (PLCs), and any suitable memory density that is greater than five bits per memory cell, and/or any other suitable memory), hard disk storage, optical media, and/or any other suitable memory, in some embodiments.

Host processor 102, CXL switch 104, PCIe device 106, and CXL.mem device 106 can communicate using any suitable interface(s) in some embodiments. For example, host processor 102, CXL switch 104, PCIe device 106, and CXL.mem device 106 can communicate using a PCIe interface, in some embodiments.

Figure 2:
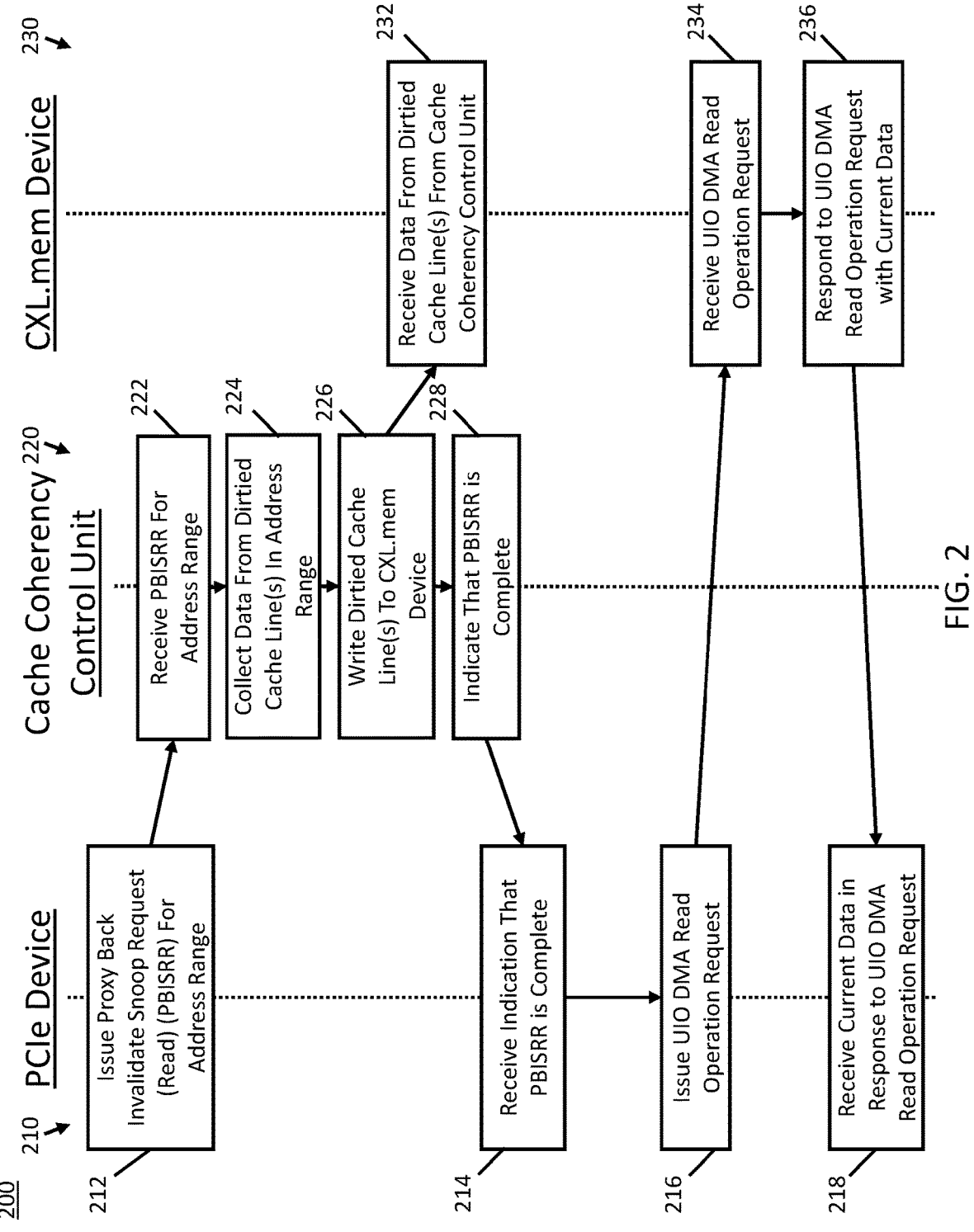
FIG. 2 is a flow diagram of an example process for an unordered input/output (UIO) direct memory access (DMA) read operation from a CXL.mem device by a PCIe device in accordance with some embodiments.

FIG. 2 illustrates a flow diagram of an example 200 of a process for an unordered input/output (UIO) direct memory access (DMA) read operation from CXL.mem device 108 by PCIe device 106, in accordance with some embodiments. This operation can be used by the PCIe device to read the memory of the CXL.mem device, in some embodiments.

As shown, process 200 includes sub-processes 210, 220, and 230 that are performed by PCIe device 106, cache coherency control unit 117, and CXL.mem device 108, respectively. Sub-process 210 includes 212, 214, 216, and 218, sub-process 220 includes 222, 224, 226, and 228, and sub-process 230 includes 232, 234, and 236.

As illustrated, process 200 begins at 212 of sub-process 210, at which the PCIe device issues a proxy back invalidate snoop request (read) (PBISRR) for a given address range in the CXL.mem device. The PBISRR is considered to be proxied because the back invalidate snoop request (read) is issued by the PCIe device rather than the CXL.mem device, in some embodiments. The PBISRR can include any suitable content, can have any suitable format, and can be issued in any suitable manner, in some embodiments. For example, in some embodiments, the PBISRR can indicate that it is for a read and that it is for the given address range.

Next, at 222 of sub-process 220, the cache coherency control unit receives the PBISRR for the given address range. The PBISRR can be received in any suitable manner in some embodiments.

Figure 3:
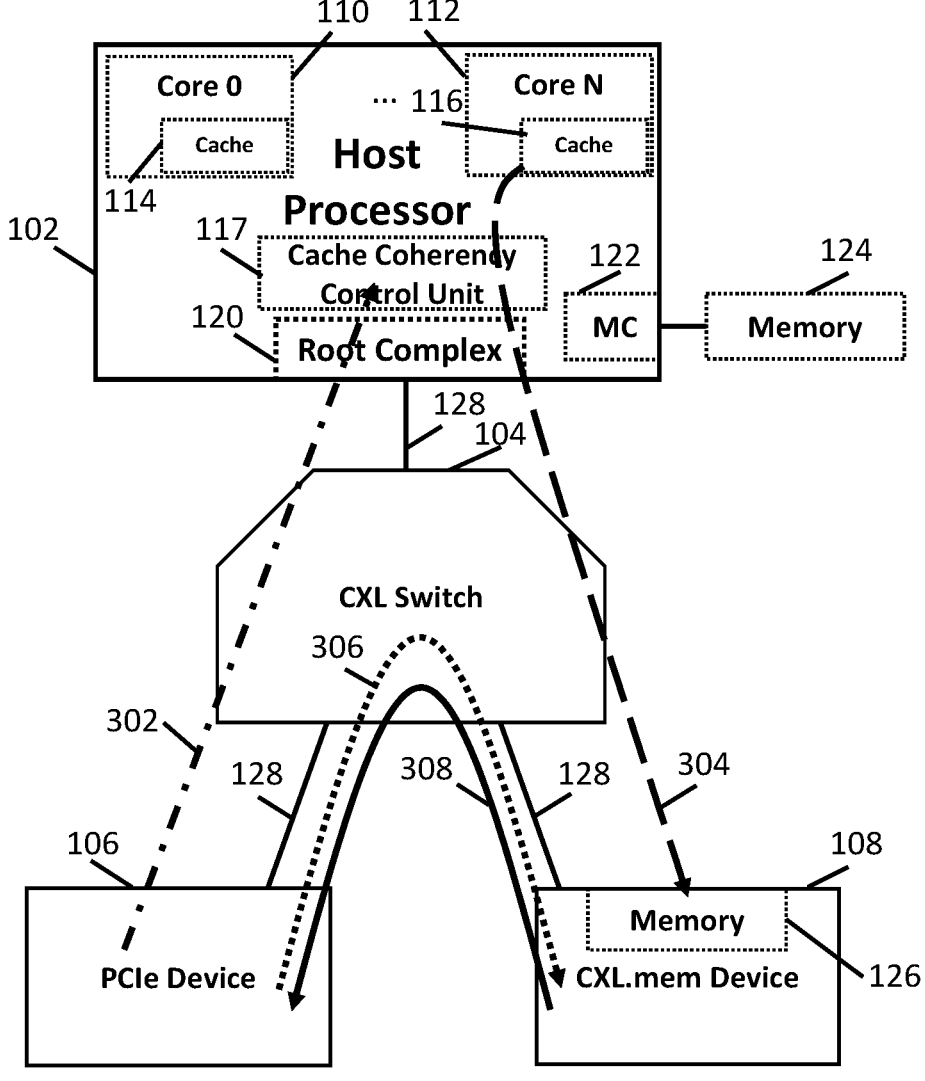
FIG. 3 is a block diagram showing an example illustration of the UIO DMA read operation of FIG. 2 in accordance with some embodiments.

Referring to FIG. 3, an example of the flow of the PBISRR is illustrated at 302, in accordance with some embodiments. As shown, the PBISRR originates at the PCIe device, is sent through the CXL switch and the root complex, and is received by the cache coherency control unit, in some embodiments.

Referring back to FIG. 2, at 224 of sub-process 220, the cache coherency control unit then collects data from dirtied cache line(s) corresponding to the given address range. A cache line is considered to be dirtied if the content of the cache line is the only up-to-date copy of that data. The cache coherency control unit collects the data from the dirtied cache line(s) from the system cache hierarchy so that it can use the collected data of the dirtied cache line(s) to update the corresponding data in the CXL.mem device. The data from any suitable number of cache lines (including only one) can be collected and the data from the cache lines can be collected in any suitable manner, in some embodiments.

Then, at 226 of sub-process 220, the cache coherency control unit writes the data collected from the system cache hierarchy to the CXL.mem device. The data from any suitable number of dirtied cache line(s) (including only one) can be written and the data from the dirtied cache line(s) can be written in any suitable manner, in some embodiments. For example, the data from the dirtied cache line(s) can be written using normal store semantics as specified in the CXL specification, in some embodiments. In some embodiments, the cache coherency control unit also updates the state of the cache line(s) to reflect as either being shared (if the host processor kept a copy) or invalid (if the cache line(s) was/were evicted from the host processor).

After 226, at 232 of sub-process 230, the CXL.mem device receives the data from the dirtied cache lines from the cache coherency control unit. The CXL.mem device can receive the data from the dirtied cache lines from the cache coherency control unit in any suitable manner in some embodiments.

Referring to FIG. 3, an example of the collection of the data from the dirtied cache line(s) and the writing of the data from the dirtied cache line(s) to the CXL.mem device is illustrated at 304, in accordance with some embodiments. As shown in the example of FIG. 3, the data from the dirtied cache line(s) is collected by the cache coherency control unit from cache 116 of processor core 112 (or any other suitable cache) and then written by the cache coherency control unit to memory 126 of CXL.mem device 108. In some embodiments, when the data from the dirtied cache line(s) is written to the CXL.mem device, the data from the dirtied cache line(s) pass through the root complex and the CXL switch, in some embodiments.

Referring back to FIG. 2, also after 226, at 228 of sub-process 220, the cache coherency control unit indicates to the PCIe device that the PBISRR is complete. This indication can be made in any suitable manner and can include any suitable content, in some embodiments. For example, in some embodiments, this indication can be made by generating a completion indicator to the PCIe device with a tag that helps that device relate the completion to the original request.

Then, at 214 of sub-process 210, the PCIe device receives the indication that the PBISRR is complete from the cache coherency control unit. The PCIe device can receive the indication that the PBISRR is complete from the cache coherency control unit in any suitable manner in some embodiments.

Then, at 216 of sub-process 210, the PCIe device issues a UIO DMA read operation request to the CXL.mem device. The UIO DMA read operation request can be made in any suitable manner and can include any suitable content, in some embodiments. For example, the UIO DMA read operation request can be made as specified in the CXL specification and can indicate the given address range to be read, in some embodiments.

Then, at 234 of sub-process 230, the CXL.mem device receives the UIO DMA read operation request. The CXL.mem device can receive the UIO DMA read operation request in any suitable manner in some embodiments.

Referring to FIG. 3, an example of the issuance of the UIO DMA read operation request from the PCIe device to the CXL.mem device is illustrated at 306, in accordance with some embodiments. As shown, the UIO DMA read operation request passes through the CXL switch but not the root complex or cache coherency control unit, in some embodiments.

Referring back to FIG. 2, at 236 of sub-process 230, the CXL.mem device then responds to the UIO DMA read operation request with current data. The response to the UIO DMA read operation request can be made in any suitable manner and can include any suitable content, in some embodiments. For example, the response to the UIO DMA read operation request can be made as specified in the CXL specification in some embodiments.

Finally, at 218 of sub-process 210, the PCIe device receives the response to the UIO DMA read operation request with the current data from the CXL.mem device. The PCIe device can receive the response to the UIO DMA read operation request with the current data from the CXL.mem device in any suitable manner, in some embodiments. Once received by the PCIe device, the current data can be used in any suitable manner and for any suitable purpose, in some embodiments.

Referring to FIG. 3, an example of the response to the UIO DMA read operation request from the PCIe device to the CXL.mem device is illustrated at 308, in accordance with some embodiments. As shown, the response to the UIO DMA read operation request passes through the CXL switch but not the root complex or cache coherency control unit, in some embodiments.

Figure 4:
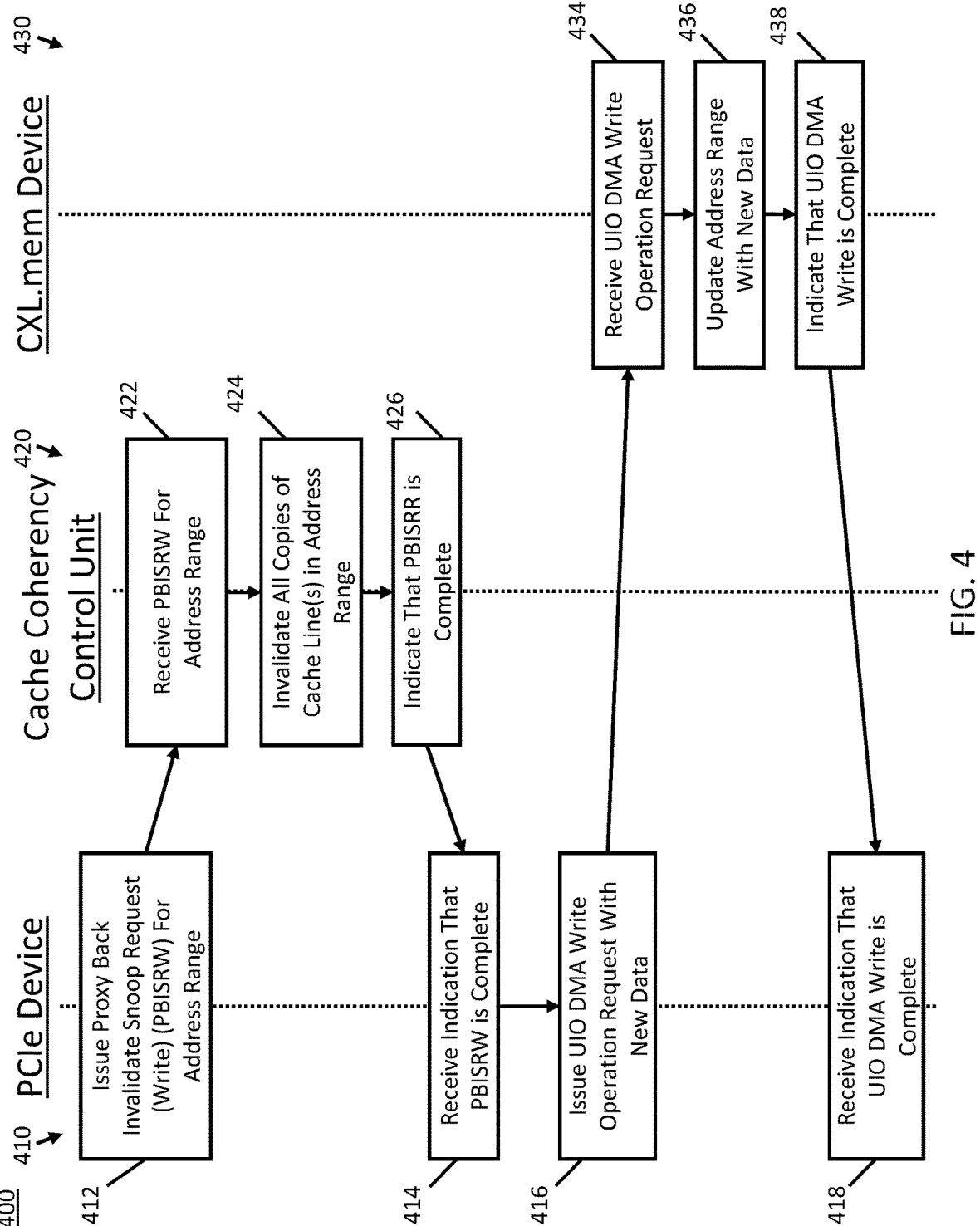
FIG. 4 is a flow diagram of an example process for an UIO DMA write operation to a CXL.mem device by a PCIe device in accordance with some embodiments.

FIG. 4 illustrates a flow diagram of an example 400 of a process for a unordered input/output (UIO) direct memory access (DMA) write operation to CXL.mem device 108 by PCIe device 106, in accordance with some embodiments. This operation can be used by the PCIe device to write to the memory of the CXL.mem device, in some embodiments.

As shown, process 400 includes sub-processes 410, 420, and 430 that are performed by PCIe device 106, cache coherency control unit 117, and CXL.mem device 108, respectively. Sub-process 410 includes 412, 414, 416, and 418, sub-process 420 includes 422, 424, and 426, and sub-process 430 includes 432, 434, 436, and 438.

As illustrated, process 400 begins at 412 of sub-process 410, at which the PCIe device issues a proxy back invalidate snoop request (write) (PBISRW) for a given address range in the CXL.mem device. The PBISRW is considered to be proxied because the back invalidate snoop request (write) is issued by the PCIe device rather than the CXL.mem device. The PBISRW can include any suitable content, can have any suitable format, and can be issued in any suitable manner, in some embodiments. For example, in some embodiments, the PBISRW can indicate that it is for a write and that it is for the given address range.

Next, at 422 of sub-process 420, the cache coherency control unit receives the PBISRW for the given address range. The PBISRW can be received in any suitable manner in some embodiments.

Figure 5:
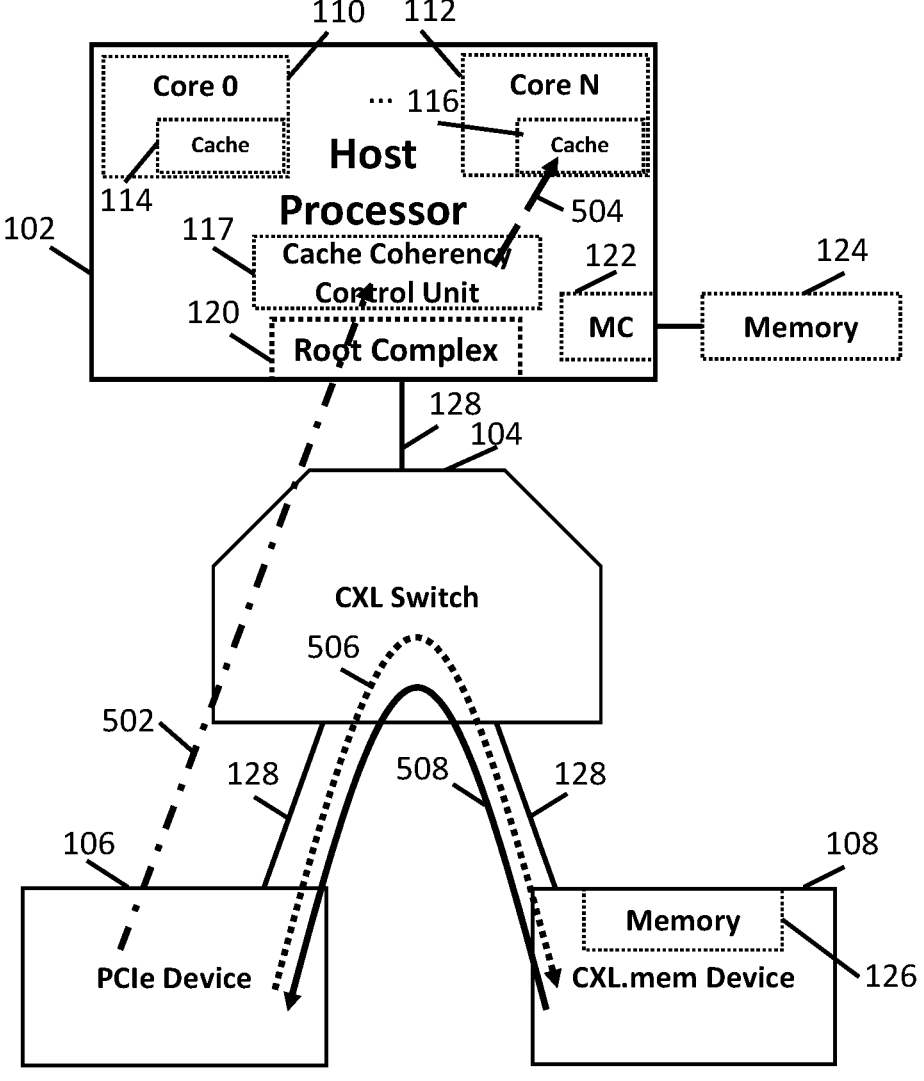
FIG. 5 is a block diagram showing an example illustration of the UIO DMA write operation of FIG. 4 in accordance with some embodiments.

Referring to FIG. 5, an example of the flow of the PBISRW is illustrated at 502, in accordance with some embodiments. As shown, the PBISRW originates at the PCIe device, is sent through the CXL switch and the root complex, and is received by the cache coherency control unit, in some embodiments.

Referring back to FIG. 4, at 424 of sub-process 420, the cache coherency control unit then invalidates all copies of cache line(s) corresponding to the given address range. Any suitable number of cache lines (including only one) can be invalidated and the cache lines can be invalidated with or without a writeback to the CXL.mem device in any suitable manner, in some embodiments.

Referring to FIG. 5, an example of the invalidation of the cache line(s) is illustrated at 504, in accordance with some embodiments.

Referring back to FIG. 4, after 424, at 426 of sub-process 420, the cache coherency control unit indicates to the PCIe device that the PBISRW is complete. This indication can be made in any suitable manner and can include any suitable content, in some embodiments. For example, in some embodiments, this indication can be made by generating a completion indicator to the PCIe device with a tag that helps that device relate the completion to the original request.

Then, at 414 of sub-process 410, the PCIe device receives the indication that the PBISRW is complete from the cache coherency control unit. The PCIe device can receive the indication that the PBISRW is complete from the cache coherency control unit in any suitable manner, in some embodiments.

Then, at 416 of sub-process 410, the PCIe device issues a UIO DMA write operation request to the CXL.mem device. The UIO DMA write operation request can be made in any suitable manner and can include any suitable content, in some embodiments. For example, the UIO DMA read operation request can be made as specified in the CXL specification and can indicate the given address range to be written to and the data to be written to that address range, in some embodiments.

Then, at 434 of sub-process 430, the CXL.mem device receives the UIO DMA write operation request. The CXL.mem device can receive the UIO DMA write operation request in any suitable manner, in some embodiments.

Referring to FIG. 5, an example of the issuance of the UIO DMA write operation request from the PCIe device to the CXL.mem device is illustrated at 506, in accordance with some embodiments. As shown, the UIO DMA write operation request passes through the CXL switch but not the root complex or cache coherency control unit, in some embodiments.

Referring back to FIG. 4, at 436 of sub-process 430, the CXL.mem device then updates the given address range of the CXL.mem device with the data specified in the UIO DMA write operation request. The updating of the given address range with the data can be performed in any suitable manner, in some embodiments. For example, in some embodiments, the updating of the given address ranged can be performed as specified in the CXL specification.

Then, at 438 of sub-process 430, the CXL.mem device indicates to the PCIe device that the UIO DMA write operation request is complete. This indication can be made in any suitable manner and can include any suitable content, in some embodiments. For example, in some embodiments, this indication can be made by a UIO response.

Finally, at 418 of sub-process 410, the PCIe device receives from the CXL.mem device the indication that the UIO DMA write operation request is complete. The PCIe device can receive from the CXL.mem device the indication that the UIO DMA write operation request is complete in any suitable manner, in some embodiments.

Referring to FIG. 5, an example of the indication that the UIO DMA write operation request is complete is illustrated at 508, in accordance with some embodiments. As shown, the indication that the UIO DMA write operation request is complete passes through the CXL switch but not the root complex or cache coherency control unit, in some embodiments.

In some embodiments, because the PCIe device issues the PBISRR and/or PBISRW early in processes 200 and/or 400, respectively, the PCIe device can perform certain actions that need to occur before making a UIO DMA request (such as reading local media and calculating error correction codes/cyclic redundancy codes and/or encrypting data prior to a UIO DMA write, fetching flash translation tables from host processor memory, performing internal buffer allocation/writeback to create "transfer" buffer space for absorbing data when the subsequent DMA is issued, and/or any other suitable operations) while the cache coherency control unit is handline cache lines as described herein. The parallelization of these activities lowers the end-to-end latency of the transaction, improving overall performance, in some embodiments.

It should be understood that at least some of the above-described blocks of the process of FIGS. 2 and 4 can be executed or performed in any order or sequence not limited to the order and sequence shown in and described in the figures. Also, some of the above blocks of the process of FIGS. 2 and 4 can be executed or performed substantially simultaneously where appropriate or in parallel to reduce latency and processing times. Additionally or alternatively, some of the above described blocks of the process of FIGS. 2 and 4 can be omitted.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, and/or any other suitable magnetic media), non-transitory optical media (such as compact discs, digital video discs, Blu-ray discs, and/or any other suitable optical media), non-transitory semiconductor media (such as flash memory, electrically programmable read-only memory (EPROM), electrically erasable programmable read-only memory (EE-PROM), and/or any other suitable semiconductor media), any suitable media that is not fleeting or devoid of any semblance of permanence during transmission, and/or any suitable non-transitory tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for requesting unordered input/output direct memory access operations, comprising:
   a memory; and
   a hardware processor coupled to the memory and configured to a least:
      issue a first request for a back invalidate snoop to a cache coherency control unit of a host processor;
      receive an indication that the first request is complete; and
      in response to receiving the indication that the first request is complete, issue a second request for an unordered input/output direct memory access operation to a Compute Express Link memory device.

2. The system of claim 1, wherein the unordered input/output direct memory access operation is a read operation.

3. The system of claim 2, wherein the hardware processor is further configured to receive a response to the second request including data from the Compute Express Link memory device.

4. The system of claim 3, wherein the data has been updated in response to the first request.

5. The system of claim 1, wherein the second request is for a write operation.

6. The system of claim 5, where the second request includes data to be written to the Compute Express Link memory device.

7. The system of claim 6, wherein a cache line is invalidated in response to the first request.

8. A method for requesting unordered input/output direct memory access operations, comprising:
   issuing using a hardware processor a first request for a back invalidate snoop to a cache coherency control unit of a host processor;
   receiving an indication that the first request is complete; and
   in response to receiving the indication that the first request is complete, issuing a second request for an unordered input/output direct memory access operation to a Compute Express Link memory device.

9. The method of claim 8, wherein the unordered input/output direct memory access operation is a read operation.

10. The method of claim 9, further comprising receiving a response to the second request including data from the Compute Express Link memory device.

11. The method of claim 10, wherein the data has been updated in response to the first request.

12. The method of claim 8, wherein the second request is for a write operation.

13. The method of claim 12, where the second request includes data to be written to the Compute Express Link memory device.

14. The method of claim 13, wherein a cache line is invalidated in response to the first request.

15. A non-transitory computer-readable medium containing computer executable instructions that, when executed by a processor, cause the processor to perform a method for requesting unordered input/output direct memory access operation, the method comprising:

issuing a first request for a back invalidate snoop to a cache coherency control unit of a host processor;

receiving an indication that the first request is complete; and in response to receiving the indication that the first request is complete, issuing a second request for an unordered input/output direct memory access operation to a Compute Express Link memory device.

16. The non-transitory computer-readable medium of claim 15, wherein the unordered input/output direct memory access operation is a read operation.

17. The non-transitory computer-readable medium of claim 16, wherein the method further comprises receiving a response to the second request including data from the Compute Express Link memory device.

18. The non-transitory computer-readable medium of claim 17, wherein the data has been updated in response to the first request.

19. The non-transitory computer-readable medium of claim 15, wherein the second request is for a write operation.

20. The non-transitory computer-readable medium of claim 19, where the second request includes data to be written to the Compute Express Link memory device.

21. The non-transitory computer-readable medium of claim 20, wherein a cache line is invalidated in response to the first request.

* * * * *